United States Patent
Lin

(10) Patent No.: US 12,374,959 B2
(45) Date of Patent: Jul. 29, 2025

(54) LINEAR ACTUATOR AND HAND ROTARY RELEASING STRUCTURE THEREOF

(71) Applicant: TIMOTION TECHNOLOGY CO., LTD., New Taipei (TW)

(72) Inventor: Yu-Chang Lin, New Taipei (TW)

(73) Assignee: TIMOTION TECHNOLOGY CO., LTD., New Taipei (TW)

( * ) Notice: Subject to any disclaimer, the term of this patent is extended or adjusted under 35 U.S.C. 154(b) by 296 days.

(21) Appl. No.: 18/214,015

(22) Filed: Jun. 26, 2023

(65) Prior Publication Data

US 2024/0348123 A1    Oct. 17, 2024

(30) Foreign Application Priority Data

Apr. 11, 2023 (TW) ................................ 112203277

(51) Int. Cl.
*H02K 7/14*     (2006.01)
*H02K 7/06*     (2006.01)
*H02K 7/112*    (2006.01)

(52) U.S. Cl.
CPC ............. *H02K 7/145* (2013.01); *H02K 7/06* (2013.01); *H02K 7/112* (2013.01)

(58) Field of Classification Search
CPC ........... H02K 7/145; H02K 7/06; H02K 7/112
See application file for complete search history.

(56) References Cited

U.S. PATENT DOCUMENTS

| | | | |
|---|---|---|---|
| 2022/0290744 A1* | 9/2022 | Lin | F16D 43/26 |
| 2023/0001490 A1* | 1/2023 | Lee | B25B 23/0035 |
| 2023/0151880 A1* | 5/2023 | Xu | H02K 7/108 |
| | | | 74/89.38 |

* cited by examiner

*Primary Examiner* — Tulsidas C Patel
*Assistant Examiner* — Mohammed Ahmed Qureshi
(74) *Attorney, Agent, or Firm* — Chun-Ming Shih; hdls ipr services

(57) ABSTRACT

A linear actuator includes an actuating mechanism, a telescopic structure and a hand rotary releasing structure. The hand rotary releasing structure includes a connecting seat, a clutch seat, a clutch, an adaptor sleeve and a return spring. A peripheral surface of the connecting seat is disposed with multiple clutch troughs. The clutch seat includes multiple engaging troughs. The clutch is disposed between the connecting seat and the clutch seat. The adaptor sleeve is disposed around the clutch and includes multiple spiral troughs. The return spring is disposed around the connecting seat and abuts against the clutch to reduce the activating time and steps of release.

18 Claims, 13 Drawing Sheets

LINEAR ACTUATOR AND HAND ROTARY RELEASING STRUCTURE THEREOF

BACKGROUND

Technical Field

The disclosure relates to a linear actuator, particularly to a linear actuator with a release structure.

Related Art

Linear actuators have been widely used in medical equipment or devices such as hospital beds, electric chairs, or other fields that require telescopic operation. Also, most linear actuators used in medical equipment such as hospital beds or hangers are provided with manual release structures. Specifically, the actuator for the hospital bed is provided with a telescopic rod connected to a load. The telescopic rod penetrates into an outer tube, and the telescopic rod sheathes a lead screw, and two ends of the lead screw are separately sheathed with a worm gear and a spring. The release structure is provided with a suppressing rod between the lead screw and the worm gear. By depressing the suppressing rod, the worm gear is separated from the lead screw, and then the telescopic rod is quickly rotated and lowered to achieving the effect of quick release.

Furthermore, the manual release mechanism for the hanger can make the hanger reset manually in case of emergency treatment or failure of power supply. However, the related-art manual release mechanism used for hanger height adjustment needs to be pressed down first and then rotate the clutch to achieve manual release. This manual release operation manner requires a long clutch distance when the clutch is actuated, and a certain movement space is required when the manual release mechanism is being operated, this results in a large operating space for the adjustment of the linear actuator and causes inconvenience. In addition, the above-mentioned manual release mechanism has many clutch actions and takes a long time, so that the linear actuator cannot achieve a more rapid release effect. In this regard, how to solve the above problems is the research goal of the inventor.

In view of this, the inventors have devoted themselves to the above-mentioned related art, researched intensively and cooperated with the application of science to try to solve the above-mentioned problems. Finally, the invention which is reasonable and effective to overcome the above drawbacks is provided.

SUMMARY

An object of the disclosure is to provide a linear actuator and a hand rotary releasing structure thereof. The release structure implements activation by a directly hand rotary manner to reduce activation time and steps of the hand rotary releasing structure and improve using convenience.

To accomplish the above object, the disclosure provides a hand rotary releasing structure of a linear actuator, which includes a connecting seat, a clutch seat, a clutch, an adaptor sleeve and a return spring. A peripheral surface of the connecting seat is spacedly disposed with multiple clutch troughs. The clutch seat is disposed on a side of the connecting seat and includes multiple engaging troughs arranged corresponding to the clutch troughs. The clutch is movably disposed between the connecting seat and the clutch seat and includes a ring, multiple clutch keys and multiple protrusions. The clutch keys are disposed on an inner surface of the ring corresponding to the clutch troughs. The protrusions are spacedly disposed on an outer surface of the ring. The adaptor sleeve is disposed around the clutch and includes multiple spiral troughs. The spiral troughs are arranged corresponding to the protrusions. The return spring is disposed around the connecting seat and abuts against the clutch.

To accomplish the above object, the disclosure provides a linear actuator, which includes an actuating mechanism, a telescopic structure and a hand rotary releasing structure. The actuating mechanism includes a motor and a lead screw driven by the motor. The telescopic structure includes a nut axially disposed around the lead screw and a telescopic tube penetrating the nut. The hand rotary releasing structure is disposed on an outer end of the telescopic tube.

In comparison with the related art, the linear actuator of the disclosure is disposed with a hand rotary releasing structure connected with a telescopic tube. The activating manner of the hand rotary releasing structure may drive the clutch to slide by rotating the adaptor sleeve to make the clutch seat (load end) separate from the connecting seat, and further make the connecting seat rotate against the clutch seat to drive the telescopic tube to rotate against the lead screw. The object of manual retraction may be achieved. In addition, in comparison with the related-art release structure, the hand rotary releasing structure of the disclosure is simpler and faster in operation, and does not need a larger operating space. This may improve convenience when using.

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
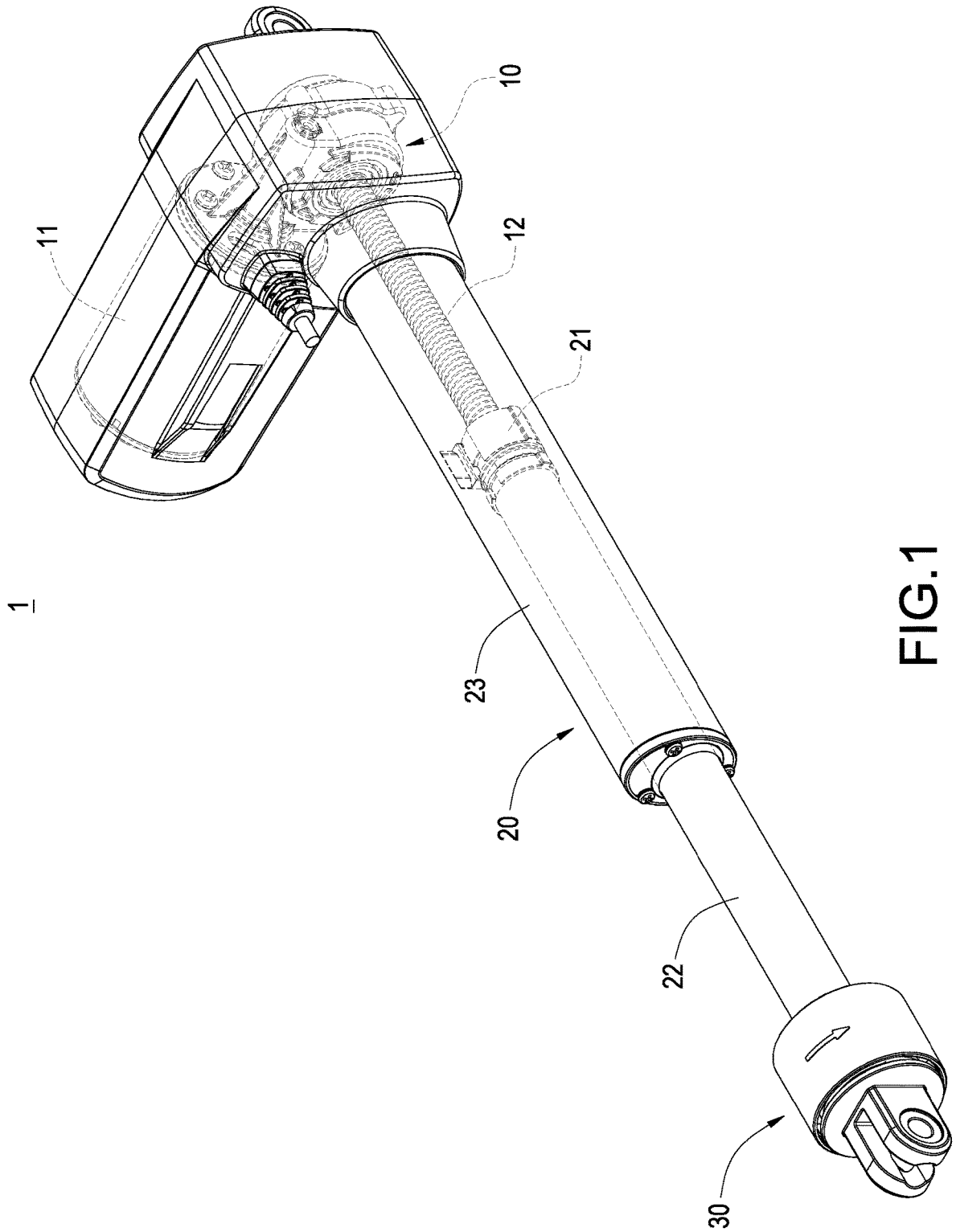
FIG. 1 is a perspective schematic view of the telescopic tube of the linear actuator of the disclosure in a stretching status.
Figure 2:
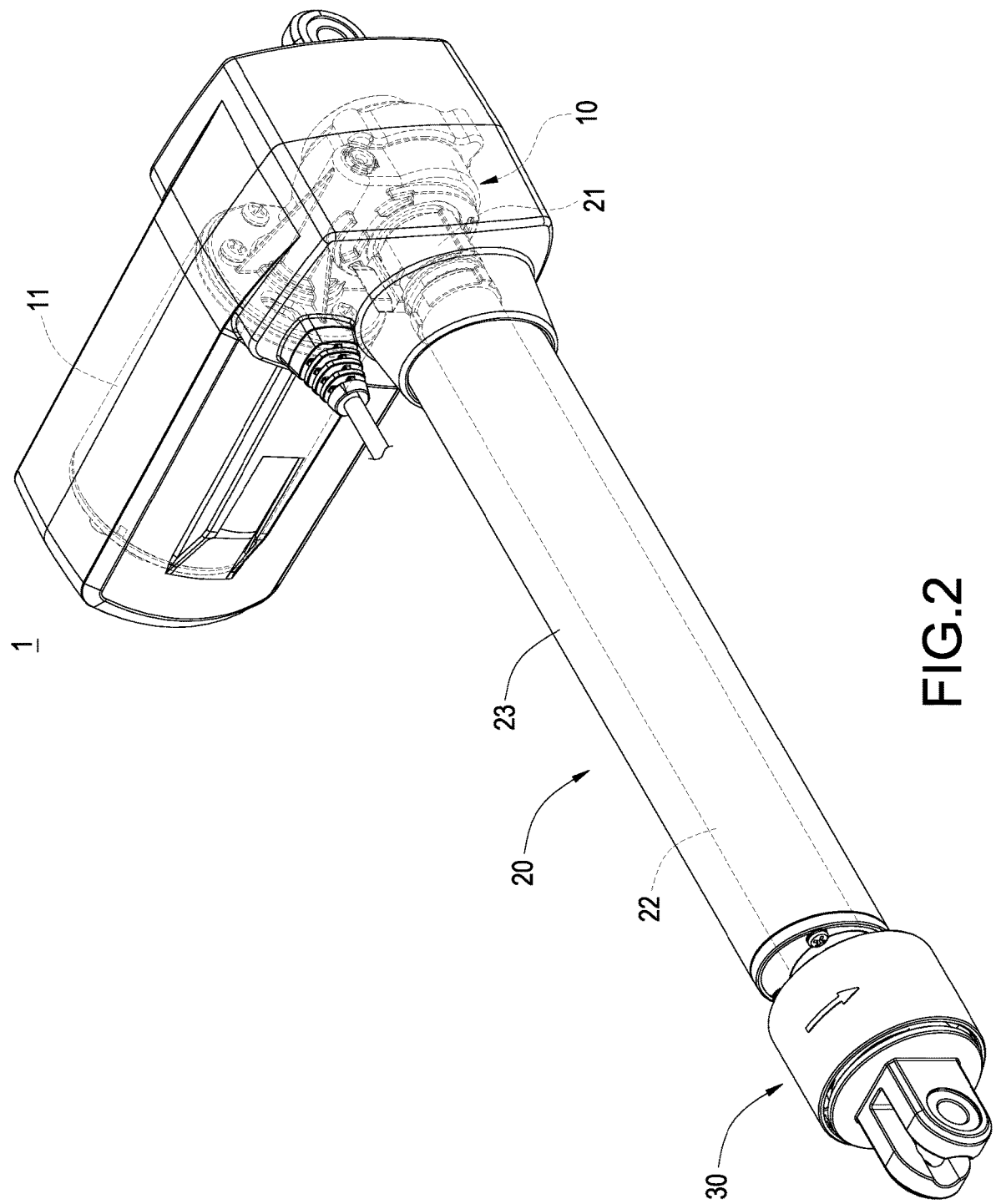
FIG. 2 is a perspective schematic view of the telescopic tube of the linear actuator of the disclosure in a retracting status.

Please refer to FIGS. 1 and 2, which are perspective schematic views of the telescopic tube of the linear actuator of the disclosure in a stretching status and a retracting status, respectively. The disclosure is a linear actuator 1 including an actuating mechanism 10, a telescopic structure and a hand rotary releasing structure 30. The actuating mechanism 10 includes a motor 11 and a lead screw 12 driven by the motor 11. The assembled structure of the actuating mechanism 10 is not the main feature of the disclosure, here is omitted for brevity. Also, the telescopic structure 20 includes a nut 21 axially disposed around (sheathing) the lead screw 12, a telescopic tube 22 penetrating the nut 21 and an outer tube 23. The nut 21 is disposed in the outer tube 23 and an end of the telescopic tube 22 is exposed from the outer tube 23 to be connected with and drive a load. In addition, the hand rotary releasing structure 30 is disposed on an outer end of the telescopic tube 22.

It is noted that the hand rotary releasing structure 30 of the disclosure is activated by hand rotation. The linear actuator 1 may achieve the action of manually retracting the telescopic tube 22 after rotating the hand rotary releasing structure 30.

Figure 3:
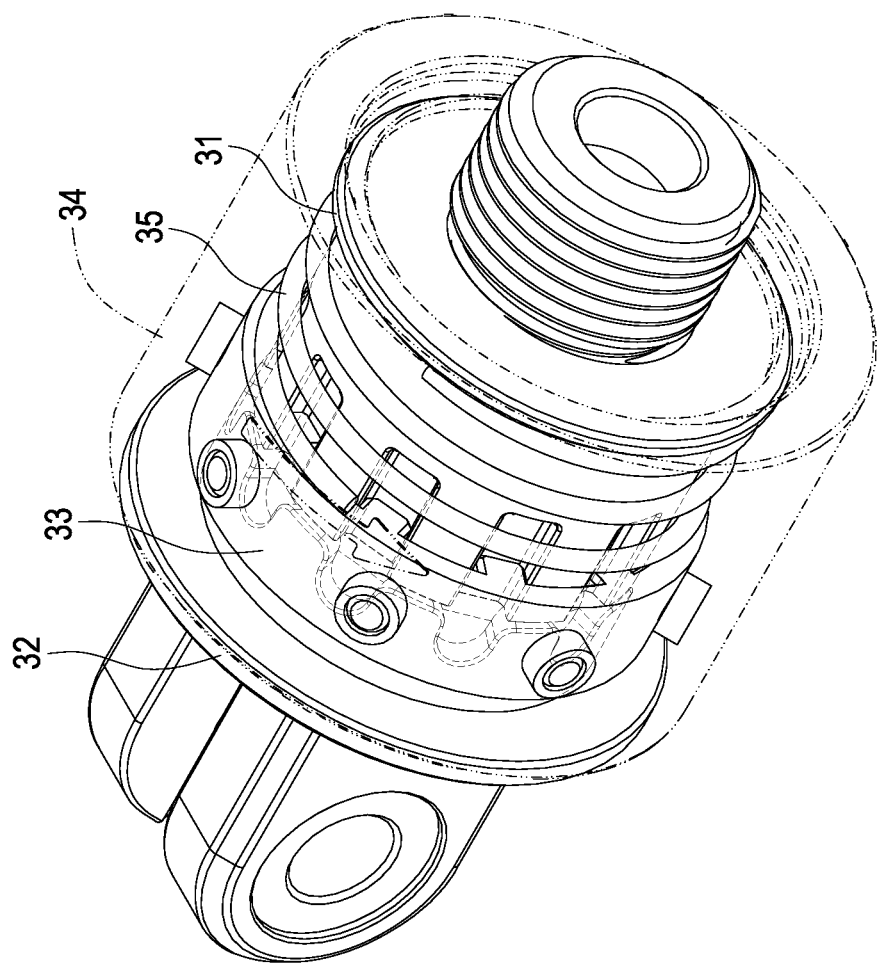
FIG. 3 is a perspective schematic view of the hand rotary releasing structure of the disclosure in an assembled status.
Figure 4:
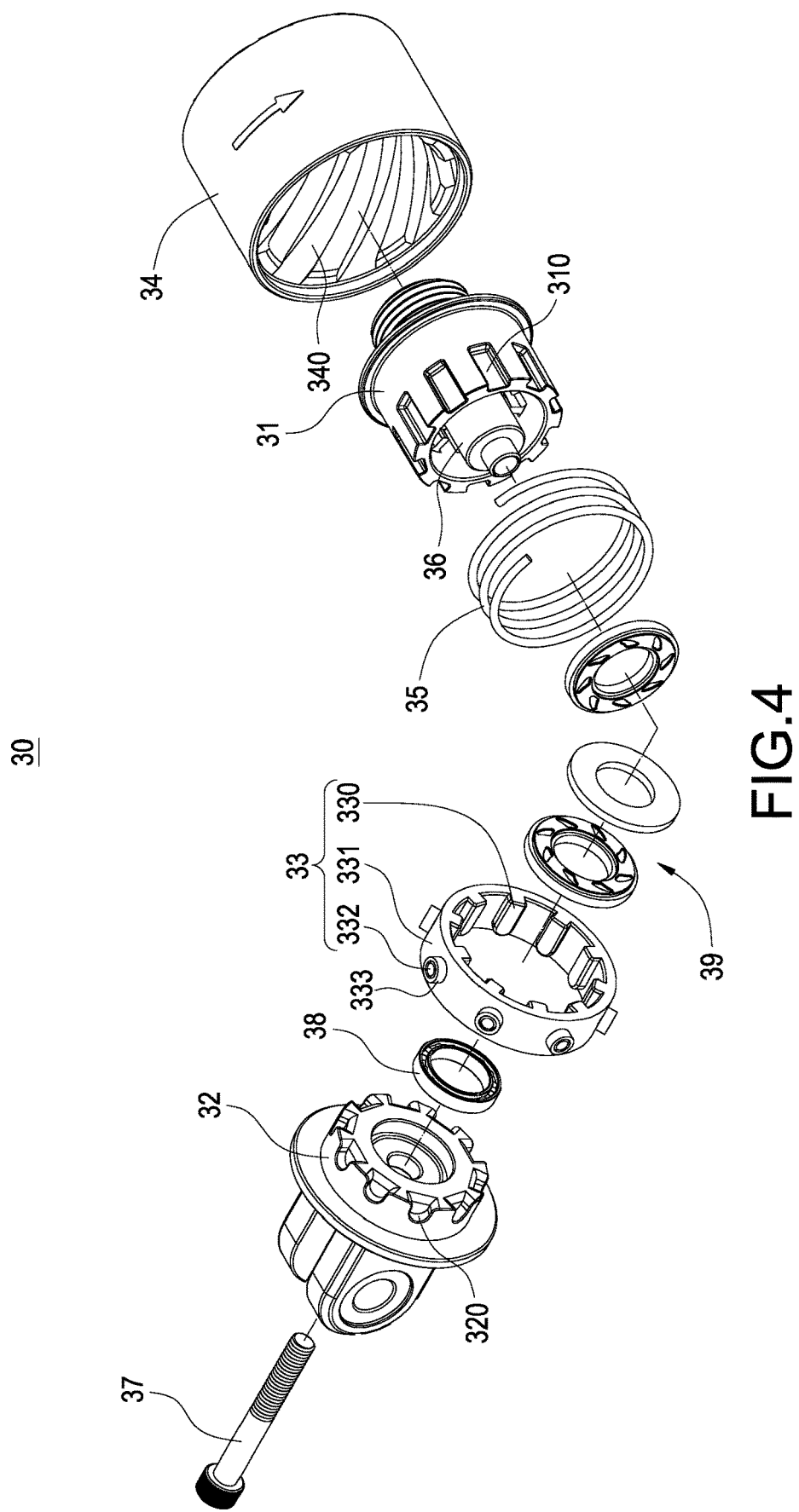
FIG. 4 is an exploded schematic view of the hand rotary releasing structure of the disclosure.
Figure 5:
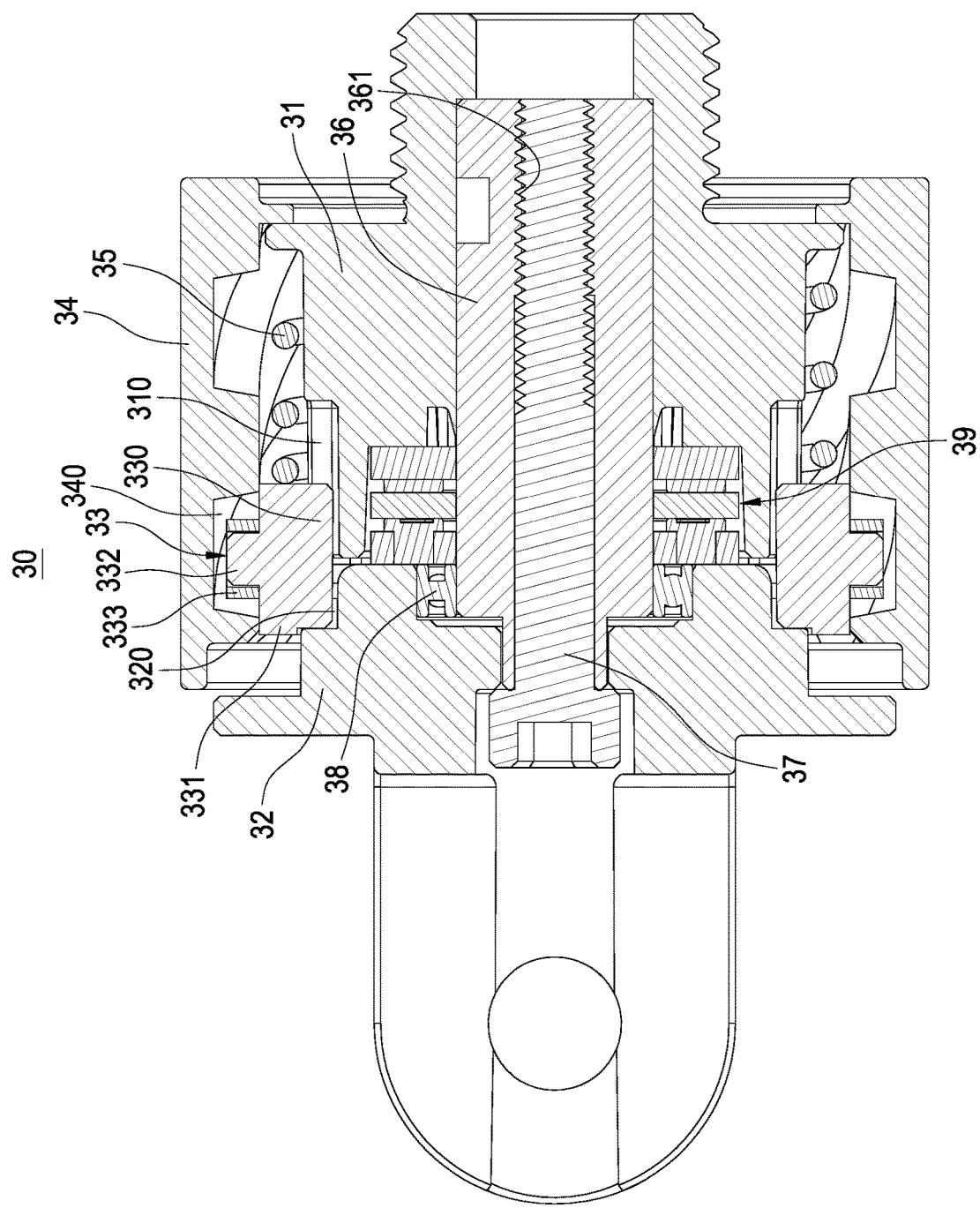
FIG. 5 is a cross-sectional view of the hand rotary releasing structure of the disclosure in an assembled status.

Please refer to FIGS. 3-5, which are a perspective schematic view of the hand rotary releasing structure in an assembled status, an exploded schematic view of the hand rotary releasing structure and a cross-sectional view of the hand rotary releasing structure in an assembled status, respectively. The hand rotary releasing structure 10 of the disclosure includes a connecting seat 31, a clutch seat 32, a clutch 33, an adaptor sleeve 34 and a return spring 35. A peripheral surface of the connecting seat 31 is spacedly disposed with multiple clutch troughs 310. The clutch seat 32 is disposed on a side of the connecting seat 31 and includes multiple engaging troughs 320 arranged corresponding to the clutch troughs 310.

Also, the clutch 33 is movably disposed between the connecting seat 31 and the clutch seat 32 and includes a ring 331, multiple clutch keys 330 and multiple protrusions 332. The clutch keys 330 disposed on an inner surface of the ring 331 corresponding to the clutch troughs 310. The protrusions 332 are spacedly disposed on an outer surface of the ring 331. In the embodiment, the clutch 33 further includes multiple anti-wear annular sheets 333 correspondingly disposed on outer surfaces of the protrusions 332.

Furthermore, the adaptor sleeve 34 is disposed around (sheathe) the clutch 33 and includes multiple spiral troughs 340. In detail, the spiral troughs 340 are disposed on an inner surface of the adaptor sleeve 34 and arranged corresponding to the protrusions 332 of the clutch 33. Also, the return spring 35 is disposed around the connecting seat 31 and abuts against the clutch 33.

In detail, the hand rotary releasing structure 30 further includes a connecting rod 36 and a screwing element 37. The connecting rod 36 has multiple inner threads 361 and is inserted in the connecting seat 31. Also, the screwing element 37 is a screw. The screwing element 37 passes through the clutch seat 32 and is screwed to the inner threads 361 of the connecting rod 36 to be connected in the connecting rod 36.

In an embodiment of the disclosure, the hand rotary releasing structure 30 further includes a bearing 38 and a brake set 39. The bearing 38 is disposed between the clutch seat 32 and the connecting rod 36. The brake set 39 is disposed between the clutch seat 32 and the connecting seat 31 and on a side of the bearing 38. It is noted that the pressure from the load born by the clutch seat 32 is transferred to the brake set 39 and further transferred from the brake set 39 to the connecting seat 31.

Figure 6:
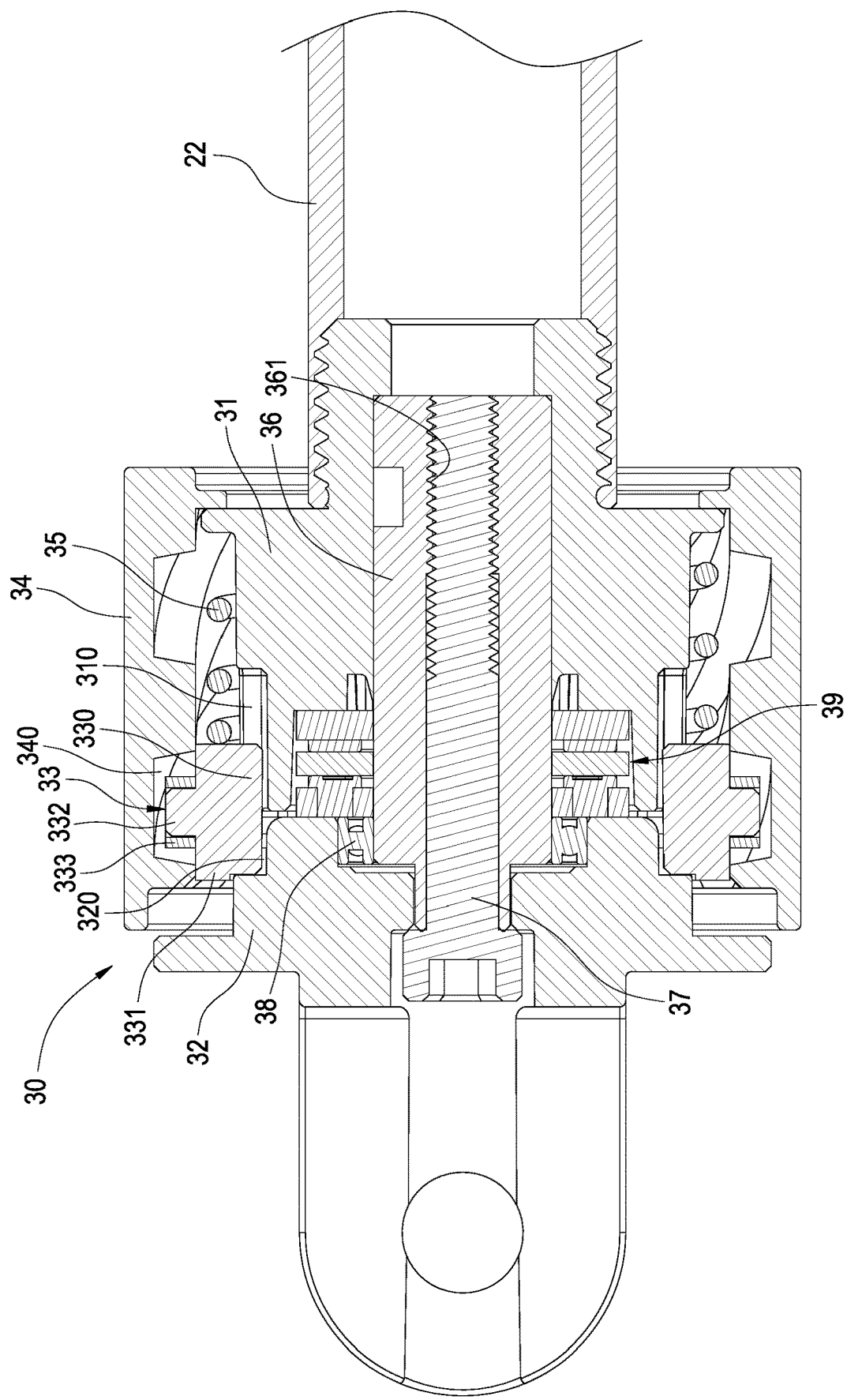
FIG. 6 is an assembled cross-sectional view of the hand rotary releasing structure and the telescopic tube of the disclosure.
Figure 7:
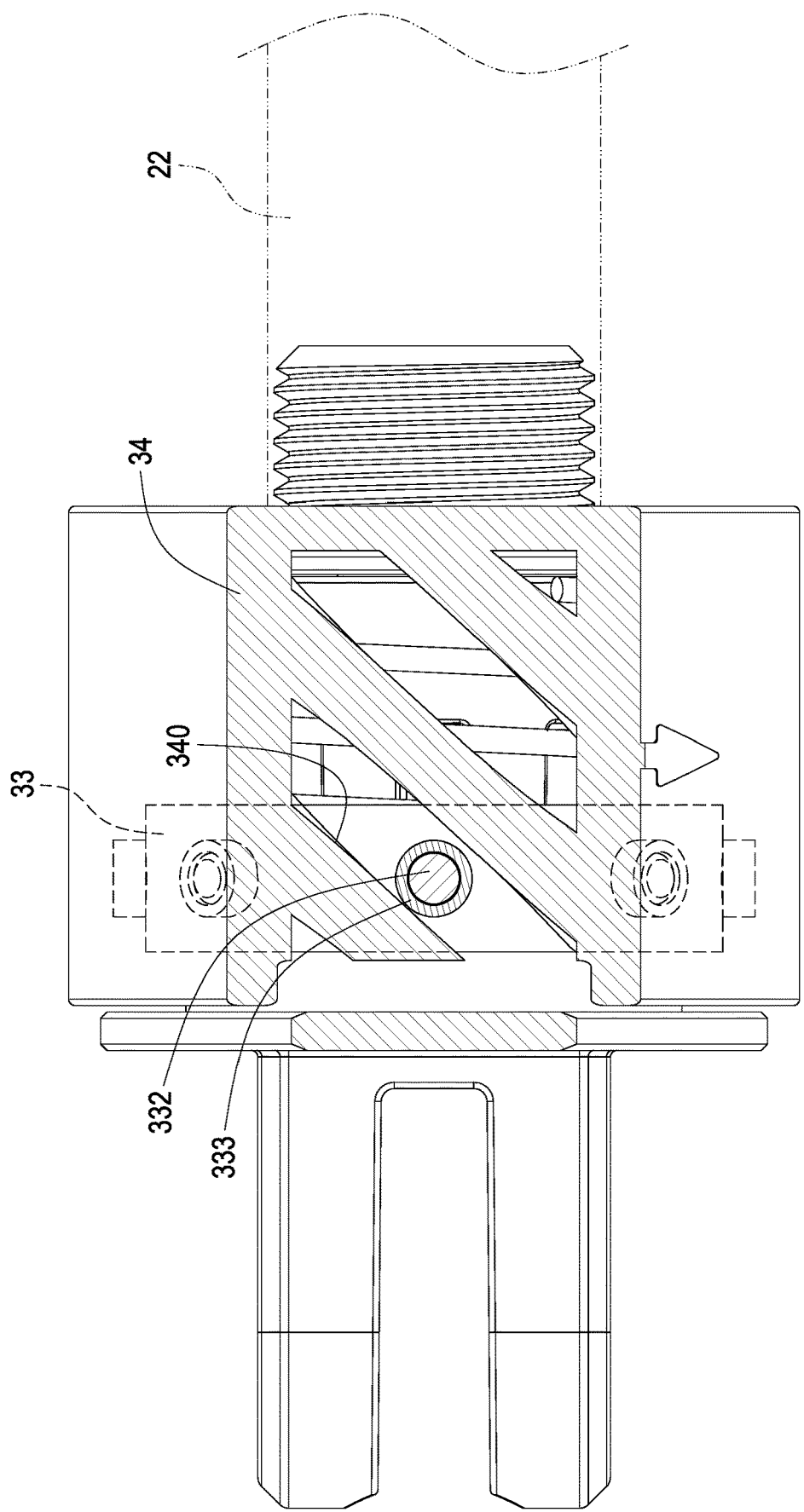
FIG. 7 is a schematic view of the relative relationship between the adaptor sleeve and the clutch of the disclosure.

Please refer to FIGS. 6-7, which are an assembled cross-sectional view of the hand rotary releasing structure and the telescopic tube of the disclosure and a schematic view of the relative relationship between the adaptor sleeve and the clutch of the disclosure, respectively. The hand rotary releasing structure 30 of the disclosure is disposed on an outer end of the telescopic tube 22. In addition, because the clutch 33 is elastically pushed by the return spring 35, the clutch keys 330 of the clutch 33 are engaged with the engaging troughs 320 of the clutch seat 32 to make the clutch seat 32 connected with the connecting seat 31. Thus, the clutch seat 32 is connected with the connecting seat 31 and is driven by the telescopic tube 22.

It is noted that the hand rotary releasing structure 30 is activated by rotating the adaptor sleeve 34. The adaptor sleeve 34 is rotated by an external force exerted, at this time, the protrusions 332 of the clutch 33 slides along the spiral troughs 340 of the adaptor sleeve 34 toward the telescopic tube 22. In the embodiment, the protrusions 332 are separately sheathed by the anti-wear annular sheets 333. The anti-wear annular sheets 333 may be advantageous to the relative movement between the clutch 33 and the adaptor sleeve 34.

Figure 8:
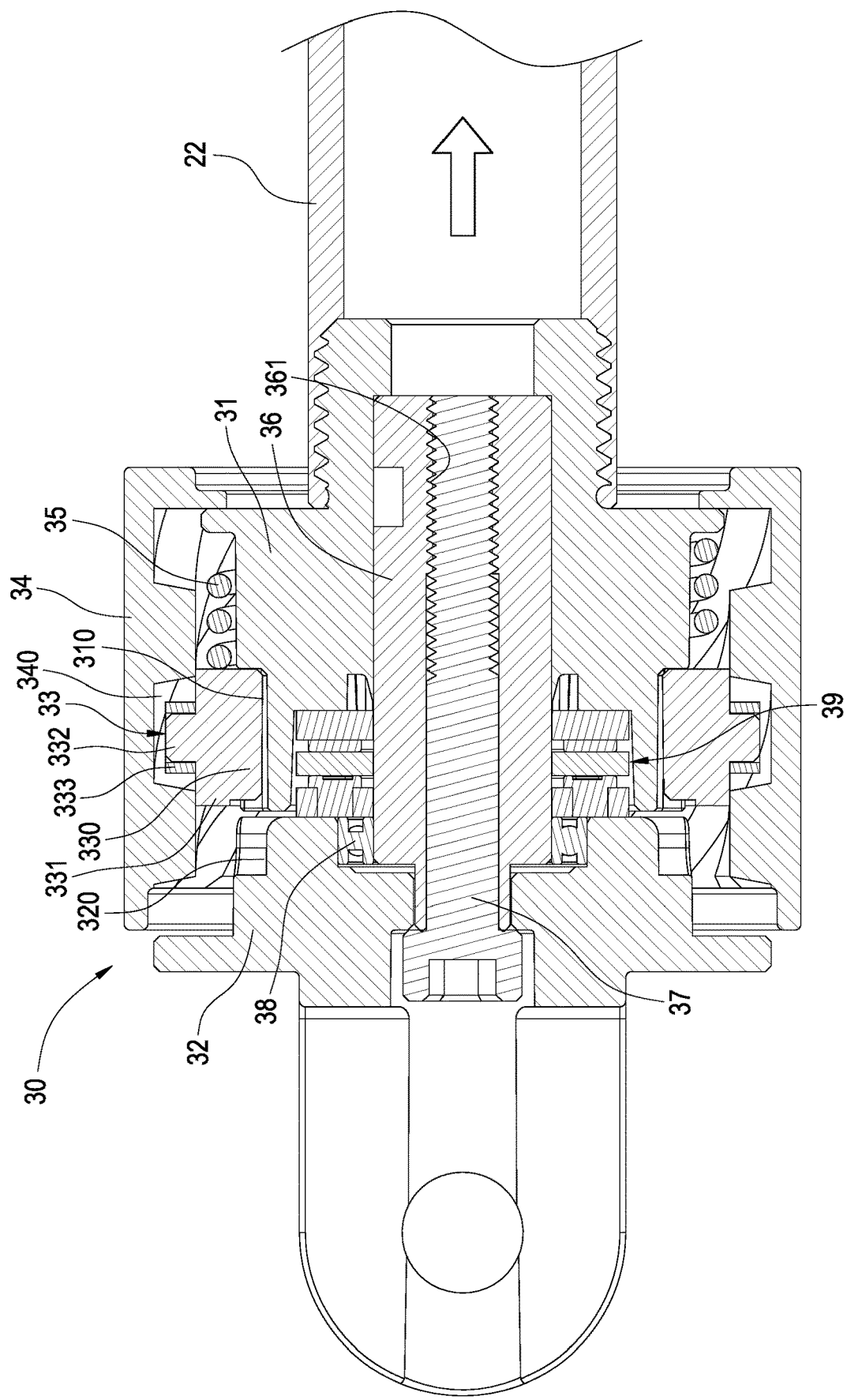
FIG. 8 is a schematic view of the movement of the hand rotary releasing structure of the disclosure.
Figure 9:
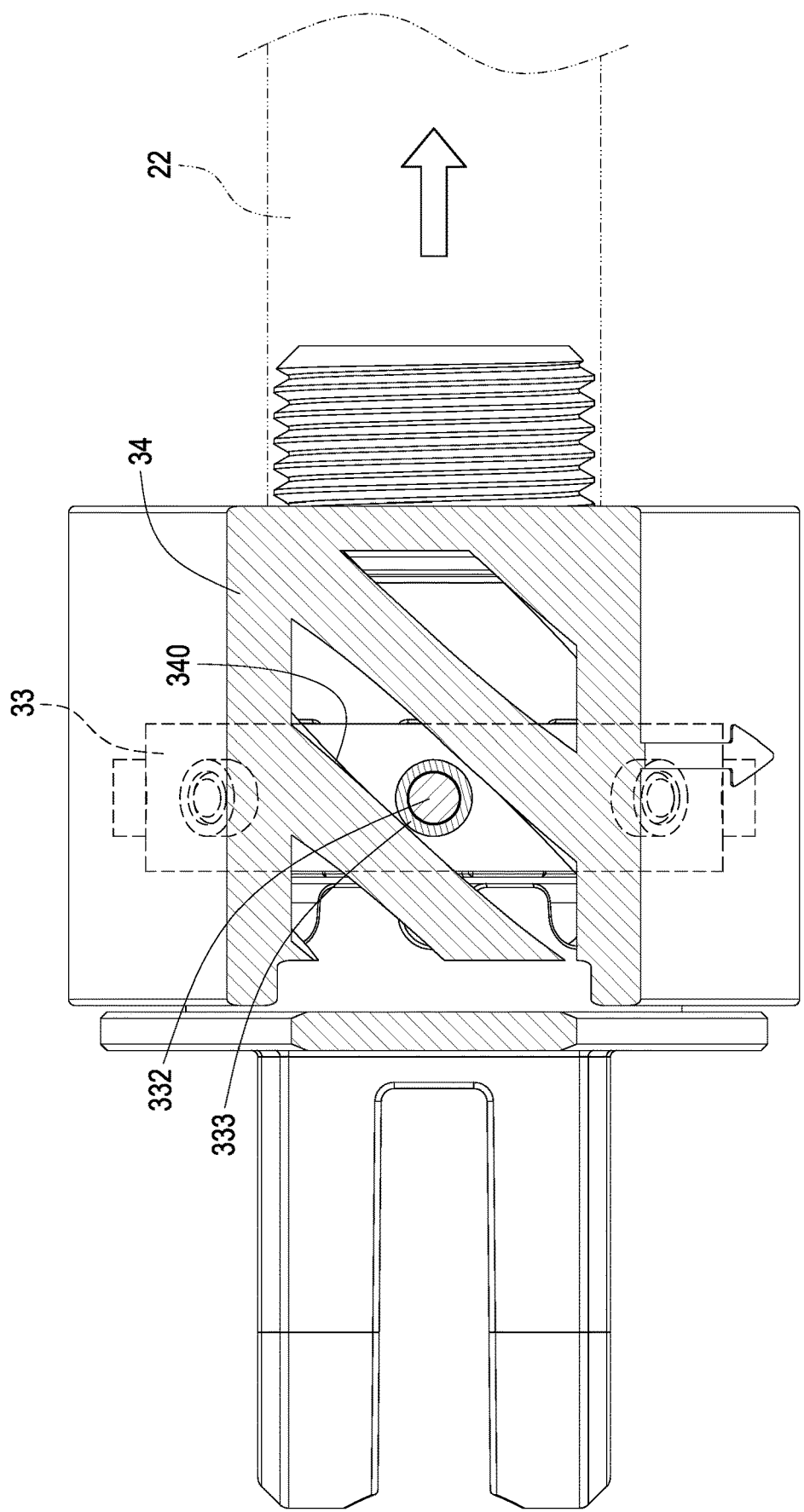
FIG. 9 is a schematic view of the operation of the hand rotary releasing structure of the disclosure.

Please refer to FIGS. 8-9, which are a schematic view of the movement of the hand rotary releasing structure of the disclosure and a schematic view of the operation of the hand rotary releasing structure of the disclosure, respectively. The adaptor sleeve 34 is rotated (in a clockwise direction) by an external force exerted and drives the clutch 33 to slide. At this time, the clutch key 330 of the clutch 33 shifts out of the engaging trough 320 of the clutch seat 32 and slides in the clutch trough 310 of the connecting seat 31 to make the clutch seat 32 (load end) separate from the connecting seat 31. As a result, the connecting seat 31 and the connecting rod 36 may rotate against the clutch seat 32 through the arrangement of the bearing 38 to drive the telescopic tube 22 to rotate against the lead screw 12 with bearing the load pressure to achieve the object of manual retraction (also refer to FIG. 1).

It is noted that when a relative rotation between the clutch seat 32 and the connecting seat 31 exists, the brake pad and the washer of the brake set 39 may generate friction to avoid the problem of excessively quick release speed while the connecting seat 31 is separating from the clutch seat 32.

It is noted that when a user stops operating the adaptor sleeve 34, the clutch 33 may utilize elasticity of the return spring 35 to return to the initial position (the clutch seat 32 is connected with the connecting seat 31).

Figure 10:
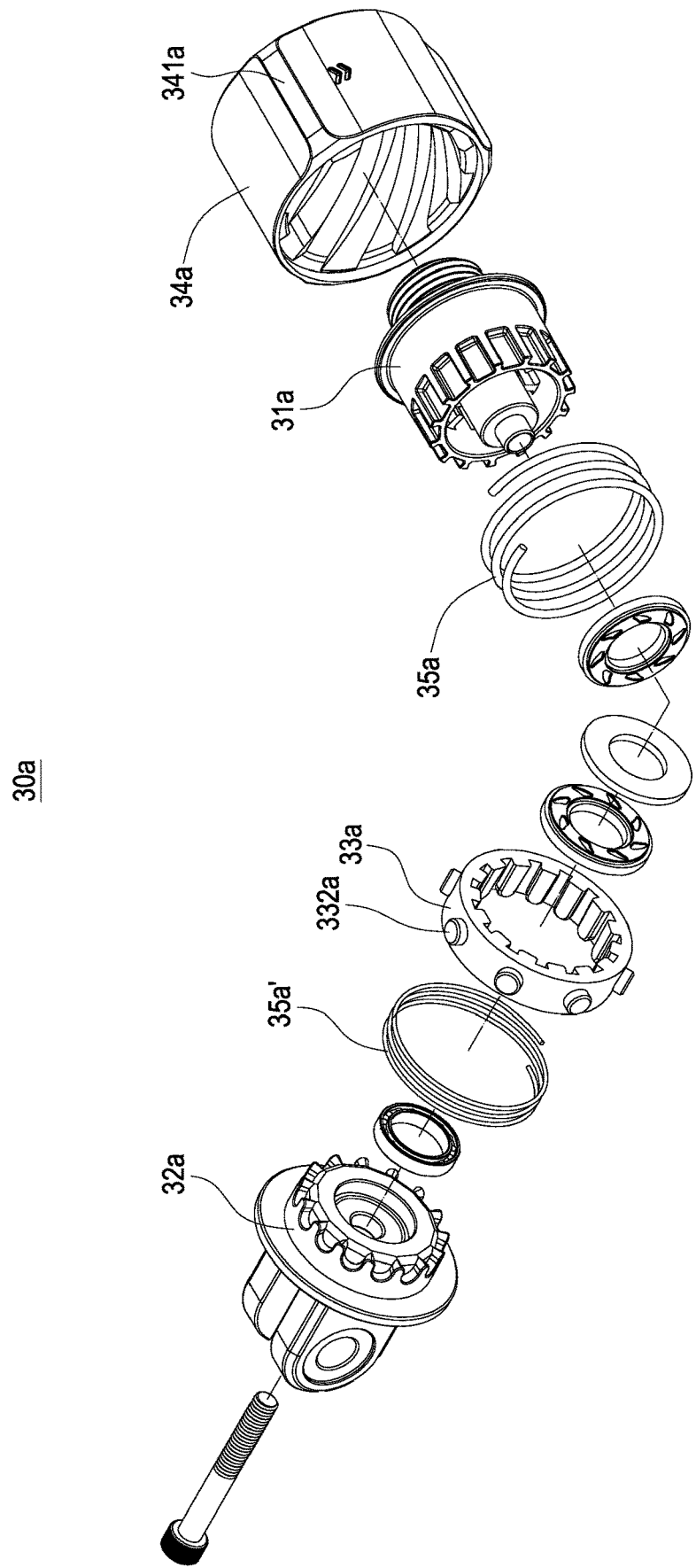
FIG. 10 is an exploded schematic view of another embodiment of the hand rotary releasing structure of the disclosure.
Figure 11:
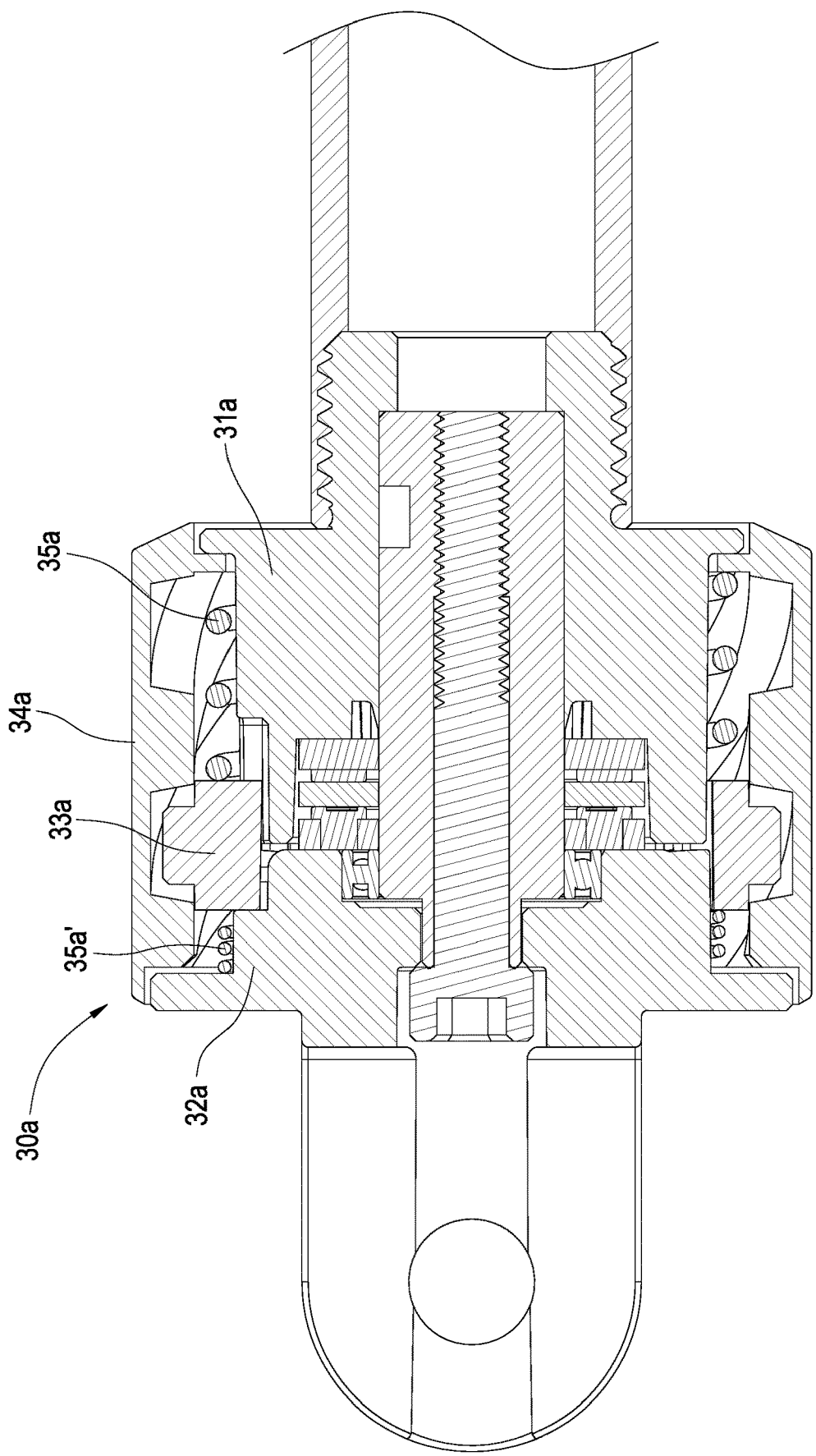
FIG. 11 is an assembled cross-sectional view of the another embodiment of the hand rotary releasing structure of the disclosure.

Please refer to FIGS. 10-11, which are an exploded schematic view of another embodiment of the hand rotary releasing structure of the disclosure and an assembled cross-sectional view of the another embodiment of the hand rotary releasing structure of the disclosure, respectively. The hand rotary releasing structure 30a of this embodiment includes a connecting seat 31a, a clutch seat 32a, a clutch 33a, an adaptor sleeve 34a and a return spring 35a. The assembling manner of the hand rotary releasing structure 30a is substantially the same as the above embodiment. Also, this embodiment differs from the above embodiment by the hand rotary releasing structure 30a further including a buffer spring 35a'. The buffer spring 35a' is disposed between the clutch 33a and the clutch seat 32a. The buffer spring 35a' is used to reduce the impact while the clutch 33a is returning without making sound. This may avoid noises when using.

In addition, another difference between this embodiment and the above embodiment is that the adaptor sleeve 34a further includes multiple anti-slip protrusive sheets 341a spacedly disposed on an outer surface of the adaptor sleeve 34a to be advantageous to being held by a user and rotating.

It is noted that in the embodiment, the protrusions 332a spacedly disposed on the clutch 33a are not disposed with anti-wear annular sheets. Also, the protrusions 332a of the clutch 33a are not disposed with anti-wear annular sheets, but it does not affect the motion of the clutch 33a. A relative movement between the clutch 33a and the adaptor sleeve 34a may still be implemented.

Figure 12:
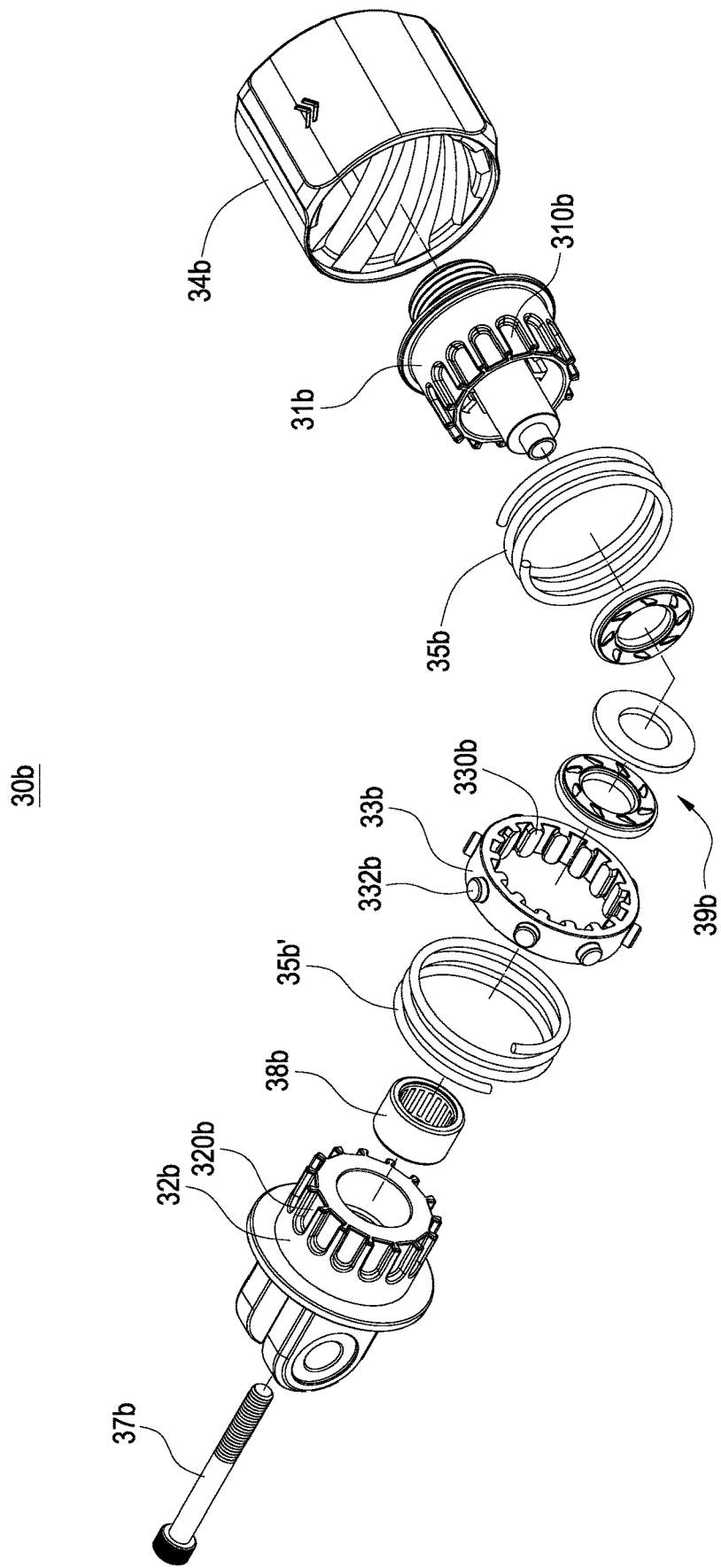
FIG. 12 is an exploded schematic view of still another embodiment of the hand rotary releasing structure of the disclosure.
Figure 13:
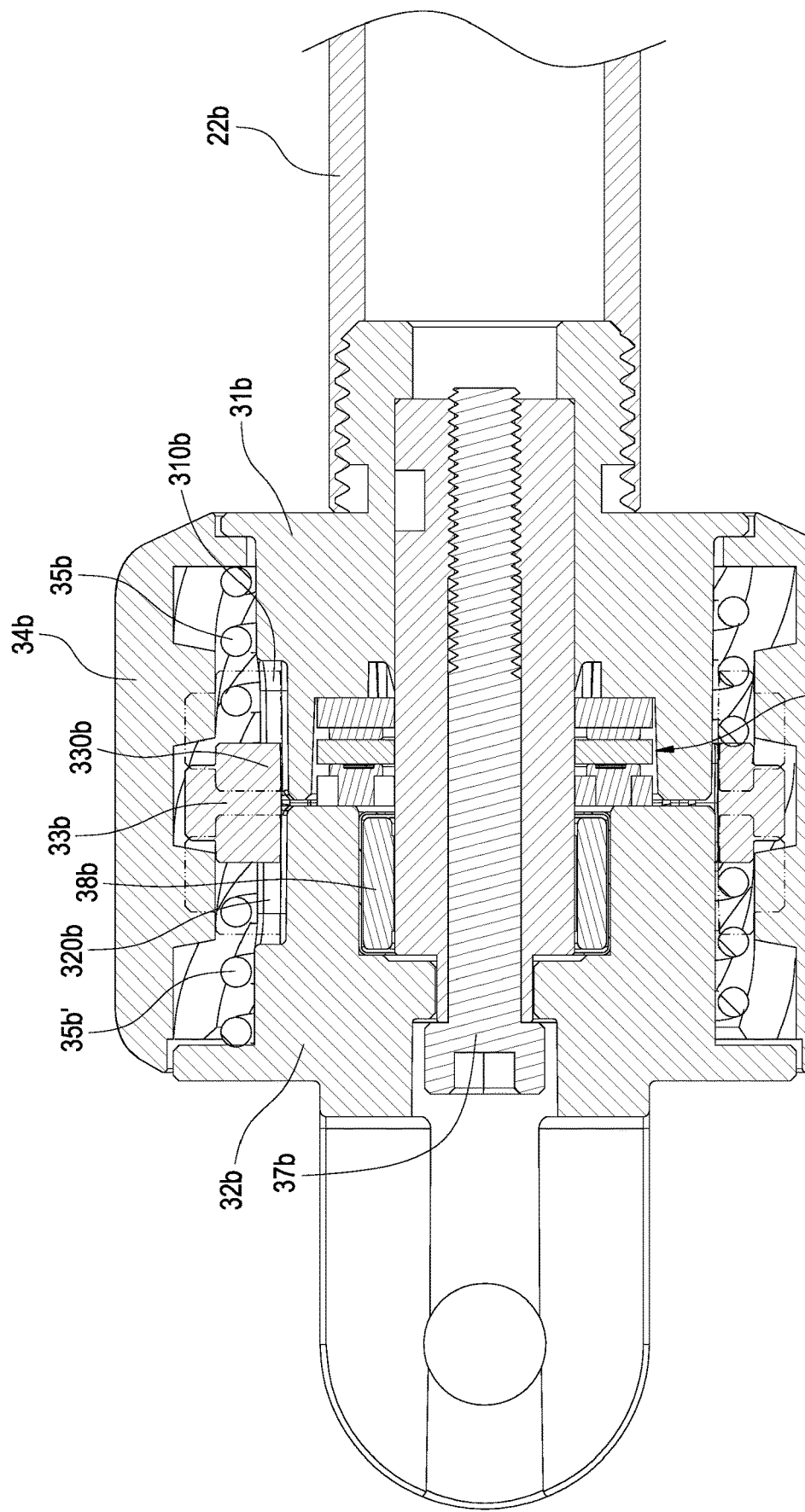
FIG. 13 is an assembled cross-sectional view of the still another embodiment of the hand rotary releasing structure of the disclosure.

Please refer to FIGS. 12-13, which are an exploded schematic view and an assembled cross-sectional view of the still another embodiment of the hand rotary releasing structure of the disclosure, respectively. The hand rotary releasing structure 30b of this embodiment includes a connecting seat 31b, a clutch seat 32b, a clutch 33b, an adaptor sleeve 34b, a return spring 35b, a buffer spring 35b', a screwing element 37b, a bearing 38b and a brake set 39b. A peripheral surface of the connecting seat 31b is spacedly disposed with multiple clutch troughs 310b. The clutch seat 32b includes multiple engaging troughs 320b arranged corresponding to the clutch troughs 310b. The clutch 33b includes multiple protrusions 332b.

Furthermore, this embodiment differs from the above embodiment by the protrusion 332b being capable of shifting in the clutch trough 310b of the connecting seat 31b or the engaging trough 320b of the clutch seat 32b. That is, both the clutch trough 310b and the engaging trough 320b may accommodate the protrusion 332b. In other words, the adaptor sleeve 34b of this embodiment may be rotated in a clockwise direction or a counterclockwise direction.

When using, the adaptor sleeve 34b is rotated in a counterclockwise direction and drives the clutch 33b to slide. At this time, the clutch key 330b of the clutch 33b is engaged with the engaging trough 320b of the clutch seat 32b, and the clutch seat 32b is separated from the connecting seat 31b.

It is noted that when a user rotates the adaptor sleeve 34b in a counterclockwise direction and keeps holding, the clutch key 330b stays in the engaging trough 320b. Also, because the clutch seat 32b is completely separated from the connecting seat 31b, the connecting seat 31b (including the telescopic tube 22) starts to rotate and the telescopic tube 22 may retracts at a faster speed.

While this disclosure has been described by means of specific embodiments, numerous modifications and variations could be made thereto by those skilled in the art without departing from the scope and spirit of this disclosure set forth in the claims.

What is claimed is:

1. A hand rotary releasing structure, comprising:
   a connecting seat, comprising multiple clutch troughs disposed spacedly on a peripheral surface thereof;
   a clutch seat, disposed on a side of the connecting seat, and comprising multiple engaging troughs arranged corresponding to the clutch troughs;
   a clutch, movably disposed between the connecting seat and the clutch seat, comprising a ring, multiple clutch keys and multiple protrusions, the clutch keys disposed on an inner surface of the ring corresponding to the clutch troughs, and the protrusions disposed spacedly on an outer surface of the ring;
   an adaptor sleeve, adapted to sheathe the clutch, comprising multiple spiral troughs, and the spiral troughs arranged corresponding to the protrusions; and
   a return spring, adapted to sheathe the connecting seat, and abutting against the clutch.

2. The hand rotary releasing structure of claim 1, wherein the spiral troughs are disposed on an inner surface of the adaptor sleeve.

3. The hand rotary releasing structure of claim 1, further comprising a connecting rod and a screwing element, wherein the connecting rod comprises multiple inner threads and is inserted in the connecting seat, and the screwing element passes through the clutch seat and is screwed to the inner threads to be connected in the connecting rod.

4. The hand rotary releasing structure of claim 3, further comprising a bearing disposed between the clutch seat and the connecting rod.

5. The hand rotary releasing structure of claim 4, further comprising a brake set disposed between the clutch seat and the connecting seat.

6. The hand rotary releasing structure of claim 5, wherein the brake set is located on a side of the bearing.

7. The hand rotary releasing structure of claim 1, further comprising a buffer spring disposed between the clutch and the clutch seat.

8. The hand rotary releasing structure of claim 1, wherein the clutch further comprises multiple anti-wear annular sheets correspondingly disposed on outer surfaces of the protrusions.

9. The hand rotary releasing structure of claim 1, wherein the adaptor sleeve further comprises multiple anti-slip protrusive sheets disposed spacedly on an outer surface of the adaptor sleeve.

10. A linear actuator comprising:
    an actuating mechanism, comprising a motor and a lead screw driven by the motor;
    a telescopic structure, comprising a nut axially disposed around the lead screw and a telescopic tube penetrating the nut; and
    a hand rotary releasing structure, disposed on an outer end of the telescopic tube, and comprising:
    a connecting seat, comprising multiple clutch troughs disposed spacedly on a peripheral surface thereof;
    a clutch seat, disposed on a side of the connecting seat, and comprising multiple engaging troughs arranged corresponding to the clutch troughs;
    a clutch, movably disposed between the connecting seat and the clutch seat, comprising a ring, multiple clutch keys and multiple protrusions, the clutch keys disposed on an inner surface of the ring corresponding to the clutch troughs, and the protrusions disposed spacedly on an outer surface of the ring;
    an adaptor sleeve, adapted to sheathe the clutch, comprising multiple spiral troughs, and the spiral troughs arranged corresponding to the protrusions; and
    a return spring, adapted to sheathe the connecting seat, and abutting against the clutch.

11. The linear actuator of claim 10, wherein the spiral troughs are disposed on an inner surface of the adaptor sleeve.

12. The linear actuator of claim 10, wherein the hand rotary releasing structure further comprises a connecting rod and a screwing element, the connecting rod comprises multiple inner threads and is inserted in the connecting seat, and the screwing element passes through the clutch seat and is screwed to the inner threads to be connected in the connecting rod.

13. The linear actuator of claim 12, wherein the hand rotary releasing structure further comprises a bearing disposed between the clutch seat and the connecting rod.

14. The linear actuator of claim 13, wherein the hand rotary releasing structure further comprises a brake set disposed between the clutch seat and the connecting seat.

15. The linear actuator of claim 14, wherein the brake set is located on a side of the bearing.

16. The linear actuator of claim 10, wherein the hand rotary releasing structure further comprises a buffer spring disposed between the clutch and the clutch seat.

17. The linear actuator of claim 10, wherein the clutch further comprises multiple anti-wear annular sheets correspondingly disposed on outer surfaces of the protrusions.

18. The linear actuator of claim 10, wherein the adaptor sleeve further comprises multiple anti-slip protrusive sheets disposed spacedly on an outer surface of the adaptor sleeve.

* * * * *